United States Patent [19]

Lightstone

[11] Patent Number: 4,712,862

[45] Date of Patent: Dec. 15, 1987

[54] OPTICAL FIBER CONNECTOR AND METHOD OF ASSEMBLING SAME

[75] Inventor: Alexander W. Lightstone, Quebec, Canada

[73] Assignee: RCA Corporation, Toronto, Canada

[21] Appl. No.: 901,036

[22] Filed: Aug. 27, 1986

[51] Int. Cl.$^4$ .............................................. G02B 6/38
[52] U.S. Cl. .............................. 350/96.21; 350/96.20; 350/96.15
[58] Field of Search .............. 350/96.20, 96.21, 96.22, 350/96.15, 96.18, 96.19

[56] References Cited

U.S. PATENT DOCUMENTS

| | | | |
|---|---|---|---|
| 4,057,319 | 11/1977 | Ash et al. | 350/96.19 X |
| 4,135,781 | 1/1979 | Archer | 350/96.20 |
| 4,158,477 | 6/1979 | Phillips et al. | 350/96.21 |
| 4,186,998 | 2/1980 | Holzman | 350/96.21 |
| 4,228,349 | 10/1980 | Ettenberg et al. | 250/226 |
| 4,372,642 | 2/1983 | Singer et al. | 350/96.12 |
| 4,383,732 | 5/1983 | Dalgoutte et al. | 350/96.20 |
| 4,452,505 | 6/1984 | Gasparian | 350/96.15 |
| 4,563,614 | 1/1986 | Howorth | 313/524 |

FOREIGN PATENT DOCUMENTS 0008835 1/1977 Japan .............................. 350/96.21

OTHER PUBLICATIONS

Microcoatings Inc., "Components for Fiber Optic Communications".
Microcoatings Inc., "Capabilities and Experience".
Microcoating Inc. advertisement, "The Microcoating Advantage".
National Photocolor Corporation, "Beam Splitting with NPC Pellicles".
T. C. Chu et al., "Measurement of Loss Due to Offset, End Separation, and Angular Misalignment in Graded Index Fibers Excited by an Incoherent Source", 57 Bell Sys. Tech. J., pp. 595–602 (1978).
J. F. Dalgleish, "A Review of Optical Fiber Connection Technology", Proc. 25th Int. Wire and Cable Symp. pp. 240–246, Nov. 1976.
D. Marcuse, "Loss Analysis of Single-Mode Fiber Splices", 56 Bell Sys. Tech. J., pp. 703–718 (1977).
G. Keiser, Optical Fiber COmmunications, McGraw Hill, p. 134 (1983).

Primary Examiner—John Lee
Assistant Examiner—John Ngo
Attorney, Agent, or Firm—Raymond A. Eckersley

[57] ABSTRACT

Fiber optic connectors typically have a light reflection occurring at the fiber to air interface. This reflection may be minimized by a connector having a supporting means with an opening therethrough, a pellicle and having first and second major surfaces wherein the first major surface is attached to the supporting means and extends over the opening and a low refection coating on the second major surface. The connector may be assembled by supporting the fiber and positioning the pellicle such that the end face of the fiber is adjacent the first major surface. The connector may also be assembled by forming the supporting means, forming the pellicle and attaching the pellicle to the supporting means such that the pellicle extends over the opening.

11 Claims, 3 Drawing Figures

OPTICAL FIBER CONNECTOR AND METHOD OF ASSEMBLING SAME

The invention relates to an optical fiber connector having a light-transmissive pellicle with a coating thereon to provide low reflectivity of light.

BACKGROUND OF THE INVENTION

An optical fiber connector typically comprises a pair of supporting means such as metallic plugs and a removable sleeve. The supporting means have both a precisely machined inner surface, for the insertion of an optical fiber, and an outer surface which is inserted into the sleeve to align the plugs.

When the connector is assembled, an end face of a first fiber will be adjacent an end face of a second fiber with air interposed between the end faces. The glass-to-air interfaces create a reflection of a percentage of a transmitted optical signal, thereby reducing the signal-to-noise ratio of the signal. The reflection may also increase the distortion of the transmitted signal and cause undesirable frequency shifting of single wavelength laser sources. Previously, an anti-reflection coating would be formed on the end faces of the optical fibers to minimize the reflectivity. However, the formation of these coatings on the fiber end faces is typically impractical at the location where an optical fiber system is being installed. Another proposed solution uses an index matching fluid, having about the same refractive index as that of the optical fibers, interposed between the fiber end faces. However, in this situation the fiber is not well supported and also the fluid typically becomes dirty resulting in poor transmission. Additionally, since a typical transmission system includes several connectors, individual connector losses in any proposed solution must be minimized to prevent an unacceptably high system transmission loss.

As demonstrated by the aforementioned problems, it would be desirable to have an easily installable fiber optic connector and method of using same which reduces the reflectivity at the connection.

SUMMARY OF THE INVENTION

An optical fiber connector for transmitting at least one wavelength comprises a means for supporting a fiber having an opening therethrough, a pellicle having first and second opposed major surfaces wherein said first major surface is attached to the supporting means such that the pellicle extends over the opening and a low reflectivity coating is on the second major surface.

The invention also includes a method of assembling an optical fiber connector comprising the steps of supporting the fiber, and positioning a pellicle, with a low reflectivity coating on a second major surface thereof, such that an end face of the fiber is positioned adjacent a first major surface of the pellicle.

A method of assembling the connector may also comprise forming a supporting means having an opening therethrough, forming a pellicle having a low reflectivity coating thereon and attaching the pellicle to the supporting means such that the pellicle extends over the opening.

DETAILED DESCRIPTION OF THE PREFERRED EMBODIMENTS

Figure 1:
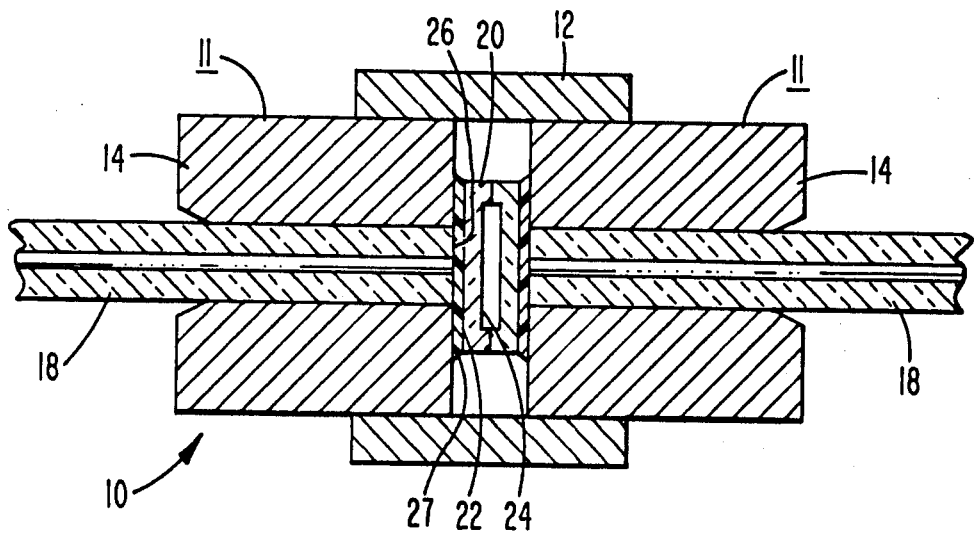
FIG. 1 depicts a cross sectional view of an embodiment the invention.
Figure 2:
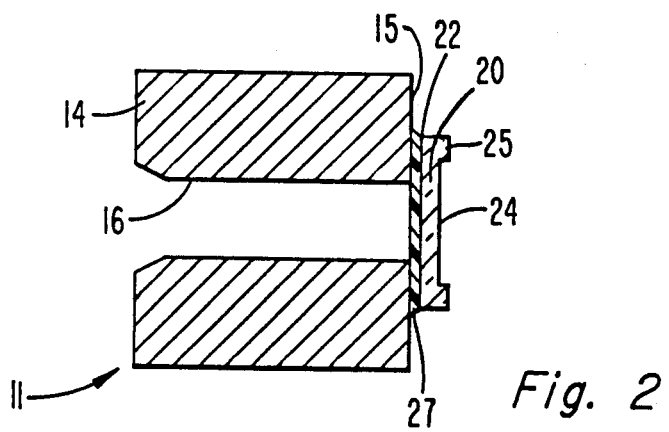
FIG. 2 depicts a cross-sectional view of a fiber termination.

In FIGS. 1 and 2 a connector 10 comprises a pair of fiber terminations 11 such as plugs which are connected by a removable sleeve 12. Each fiber termination 11 comprises a supporting means 14 having a side 15 and an opening 16 extending axially therethrough in which to insert a fiber 18. A pellicle 20, having first and second opposed major surfaces 22 and 24, respectively, and a peripheral edge 25 extending outwards from the second major surface 24, is attached to the supporting means 14 such that an end face 26 of the fiber 18 may be positioned adjacent the first major surface 22 with a transparent adhesive 27 interposed therebetween. The second major surface 24 has a low reflectivity coating thereon.

The supporting means 14 and sleeve 12 are typically formed of metal such as stainless steel or alternatively, may be formed of ceramic or plastic or other suitable materials. The opening 16 is generally formed in the center of the supporting means 14 and the outer surfaces of the supporting means 14 are precisely machined such that a pair of openings 16 may be aligned by aligning the outer surfaces with the sleeve 12.

The pellicle 20 is formed of a material which is at least partially transparent and preferably substantially transparent at the transmitting wavelength such as glass or plastic. It is to be understood that the pellicle may be formed of materials having a different refractive index than the fiber, although an additional low reflection coating on the first major surface 22 may be desirable for the interface between the adhesive 27 and the pellicle 20.

Various fiber types are more susceptible to losses from fiber separation, although with all fibers thinner pellicles result in lower transmission loss. Generally, the pellicle should be less than about 50 micrometers ($\mu$m) thick to contribute no greater than about 10% transmission loss in the connector. For step-index fibers the pellicle thickness must be less than about 0.02 times the fiber core diameter, divided by the numerical aperture to maintain a transmission loss no greater than 10%. The core being the region in the fiber through which the optical signal propagates and the numerical aperture is the sine of the acceptance angle of the fiber. Typically in step-index fibers the numerical aperture is approximately 0.2 and the fiber core diameter is approximately 100 $\mu$m, thus the pellicle should be less than about 10 $\mu$m thick. For graded index fibers the pellicle thickness should be less than about 0.15 times the fiber core diameter divided by the numerical aperture. In a typical telecommunications fiber the fiber core diameter is approximately 50 $\mu$m and the numerical aperture is approximately 0.2, thus the pellicle thickness should be less than about 37 $\mu$m. For monomode fibers the pellicle thickness should be less than about 1.5 times the mean field radius squared, divided by the light transmission wavelength, where the mean field radius is the width parameter of a gaussian field representation of the fiber. Typically the mean field radius is approximately 4.5 $\mu$m and the light wavelength is approximately 1.3 $\mu$m, thus the pellicle should be less than about 23 $\mu$m thick.

Figure 3:
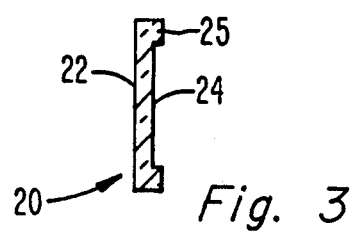
FIG. 3 depicts a cross-sectional view of a pellicle.

As shown in FIG. 3 it is preferable to form the peripheral edge 25 to protect the central portion of the pellicle 20 from scratches and to provide an air space between fiber terminations 11. The edge 25 is typically about 3 μm in height and is preferably formed of the same material as the pellicle 20 by standard photolithographic and etching processes prior to forming the low reflectivity coating.

The second major surface 24 has a low reflectivity coating thereon, such as a four layer, hard oxide, antireflection coating or other antireflection coatings as described by O.S. Heavens in *Optical Properties Of Thin Solid Films*, (Dover Press 1955); a low reflectivity coating being one having a reflectivity of less than 2.0%, typically less than 0.6%, and preferably less than 0.35%. The coating is typically formed by well-known vacuum deposition techniques and may be adjusted for low reflectivity at one or more wavelengths.

The pellicle 20 is typically formed by coating a surface of a substrate such as a glass slide, typically about 170 μm thick, with a low reflectivity coating. The low reflectivity coating surface is masked and etched about 10 μm deep such as by standard photolithographic processes and etching with HF acid to form a plurality of 2 millimeter (mm) diameter discs protruding about 10 μm from the surface of the glass. The low reflectivity surfaces are then coated with wax and the opposed major surface is etched to remove the remainder of the substrate, thereby forming a plurality of pellicles about 10 μm thick. Pellicles may also be formed by standard machining and scribing or, in the case of plastic films, by punching processes.

The pellicle 20 is typically attached to the supporting means 14 and the fiber end face 26 is attached to the pellicle 20 by a thin uniform coat of transparent adhesive 27 such as glue or epoxy which preferably has a refractive index approximately the same as that of the pellicle 20 and the fiber 18. The connector 10 is typically assembled by first inserting and attaching the fiber 18 in the supporting means 14 with an adhesive such as epoxy, such that the end face of the fiber extends past a side of the supporting means 12. The side 15 of the supporting means 14 and the fiber end face 26 are then simultaneously polished. Finally a thin layer of adhesive 27 is formed over the end face 26 and the supporting means 14. The first major surface 22 is then attached to the supporting means 14 and the fiber end face 26. Alternatively, the fiber termination 11 may be previously assembled and the fiber 18 and adhesive 26 may be subsequently inserted. It should be noted that the adhesive 27 elimninates any air gap interposed between the fiber end face 26 and the first major surface 22, thereby preventing a glass-to air interface which would create undesirable signal reflections.

In a standard fiberoptic connector which does not employ the present invention the reflectivity is typically about 3.5% at each fiber end face. In contrast, the present invention provides a fiber termination which may be easily installed at the location of the optical fiber system, provides an acceptable level of transmission loss and typically reduces the reflectivity on to about 0.3%.

I claim:

1. A fiber optic connector for transmitting at least one wavelength comprising:
   first means having a first opening for supporting a first fiber extending therethrough;
   a first pellicle which is at least partially transparent at the transmitting wavelength and having first and second major surfaces wherein said first major surface extends over the first opening of said first supporting means and is attached to said first supporting means and said first fiber;
   a low reflectivity coating on said second major surface of said first pellicle;
   a second means having a second opening for supporting a second fiber extending therethrough;
   a second pellicle which is at least partially transparent at the transmittng wavelength and having first and second major surfaces wherein its first major surface extends over the second opening of said second supporting means and is attached to said second supporting means and said second fiber;
   a low reflectivity coating on said second major surface of said second pellicle; and
   removable sleeve means connecting and aligning said first and second supporting means in spaced apart relation with a predetermined air gap between the second major surfaces of the first and second pellicles.

2. The connector of claim 1 wherein each pellicle has a reflectivity of less than about 2%.

3. The connector of claim 1 wherein the thickness of each pellicle is less than about 50 micrometers thick.

4. The connector of claim 1 wherein each pellicle has a thickness less than about 0.15 times the fiber core diameter divided by the fiber numerical aperture.

5. The connector of claim 4 wherein each pellicle has a thickness less than about 0.02 times the fiber core diameter divided by the fiber numerical aperture.

6. The connector of claim 1 wherein each pellicle has a thickness less than about 1.5 times the mean field radius squared of the fiber divided by said wavelength.

7. The connector of claim 1 wherein each pellicle has a peripheral edge portion extending a predetermined distance outwards from said second major surface.

8. The connector of claim 1 wherein an adhesive is interposed between an end face of each fiber and the corresponding first major surface.

9. A method of assembling an optical fiber connector for a particular wavelength comprising the steps of:
   supporting a first fiber;
   positioning a first pellicle having first and second opposed major surfaces with a low reflection coating on said second surface, such that an end face of said first fiber is positioned adjacent said first major surface;
   supporting a second fiber;
   positioning a second pellicle having first and second opposed major surfaces with a low reflection coating on said second surface, such that an end face of said second fiber is positioned adjacent said first major surface of said second pellicle having a low reflectivity coating thereon; and
   connecting said first and second fibers such that the second major surfaces of the first and second pellicles are spaced apart a predetermined distance providing an air gap therebetween.

10. The method of claim 9 wherein an adhesive is interposed between each fiber end face and said corresponding first major surface.

11. The method of claim 10 further comprising the step of positioning a sleeve to connect said first and second fibers.

* * * * *